US009752693B2

(12) United States Patent
Chaffee

(10) Patent No.: US 9,752,693 B2
(45) Date of Patent: Sep. 5, 2017

(54) SELF-SEALING VALVE

(71) Applicant: Robert B. Chaffee, Portland, ME (US)

(72) Inventor: Robert B. Chaffee, Portland, ME (US)

( * ) Notice: Subject to any disclaimer, the term of this patent is extended or adjusted under 35 U.S.C. 154(b) by 0 days.

(21) Appl. No.: 14/419,102

(22) PCT Filed: Aug. 2, 2013

(86) PCT No.: PCT/US2013/053442
§ 371 (c)(1),
(2) Date: Feb. 2, 2015

(87) PCT Pub. No.: WO2014/022782
PCT Pub. Date: Feb. 6, 2014

(65) Prior Publication Data
US 2015/0219229 A1    Aug. 6, 2015

Related U.S. Application Data

(60) Provisional application No. 61/679,228, filed on Aug. 3, 2012.

(51) Int. Cl.
*F16K 15/00* (2006.01)
*F16K 15/20* (2006.01)
(Continued)

(52) U.S. Cl.
CPC ............ *F16K 15/20* (2013.01); *A47C 27/083* (2013.01); *F16K 15/031* (2013.01);
(Continued)

(58) Field of Classification Search
CPC .......... Y10T 137/3584; Y10T 137/788; Y10T 137/7881; Y10T 137/7882;
(Continued)

(56) References Cited

U.S. PATENT DOCUMENTS

| 625,114 A | 5/1899 | MacSpadden |
|---|---|---|
| 679,519 A | 7/1901 | Smith |

(Continued)

FOREIGN PATENT DOCUMENTS

| CN | 2531195 Y | 1/2003 |
|---|---|---|
| CN | 1107182 C | 4/2003 |

(Continued)

OTHER PUBLICATIONS

Supplementary European Search Report from corresponding PCT Application No. PCT/2013/053442 mailed Mar. 2, 2016.
(Continued)

*Primary Examiner* — R. K. Arundale
(74) *Attorney, Agent, or Firm* — Lando & Anastasi, LLP

(57) ABSTRACT

A fluid controller comprising a self sealing valve is disclosed. The fluid controller includes a rim that defines a fluid passage for a flow of fluid inflation and deflation of an inflatable bladder. A diaphragm is configured to seal the fluid passage, and the self sealing valve also includes at least one extension configured to extend over the diaphragm to limit a deflection of the diaphragm in a direction away from the interior of the inflatable bladder to maintain a substantially fluid-tight seal between the diaphragm and the rim under increased pressure within the inflatable bladder.

27 Claims, 4 Drawing Sheets

(51) Int. Cl.
*A47C 27/08* (2006.01)
*F16K 15/03* (2006.01)

(52) U.S. Cl.
CPC ....... *F16K 15/202* (2013.01); *Y10T 137/0396* (2015.04); *Y10T 137/3584* (2015.04); *Y10T 137/7898* (2015.04)

(58) Field of Classification Search
CPC ......... Y10T 137/7891; Y10T 137/7892; Y10T 137/7895
USPC .......................................................... 5/706
See application file for complete search history.

(56) References Cited

U.S. PATENT DOCUMENTS

| | | | |
|---|---|---|---|
| 827,823 A | 8/1906 | Starr |
| 1,185,684 A | 6/1916 | Kraft et al. |
| 1,263,599 A | 4/1918 | Poole |
| 2,064,695 A | 12/1936 | Sipe |
| 2,112,641 A | 3/1938 | Wheaton |
| 2,288,889 A | 7/1942 | Costello |
| 2,482,198 A | 9/1949 | Melichar |
| 2,554,719 A | 5/1951 | Pettitt |
| 2,595,406 A | 5/1952 | Popovich |
| 2,701,579 A | 2/1955 | Hasselquist |
| 2,767,735 A | 10/1956 | Darling |
| 2,803,527 A | 8/1957 | Lundahl |
| 2,949,927 A | 8/1960 | Mackal |
| 3,086,698 A | 4/1963 | Goldstein |
| 3,123,336 A | 3/1964 | Price |
| 3,208,721 A | 9/1965 | McHugh |
| 3,354,903 A | 11/1967 | Caruso |
| 3,403,696 A | 10/1968 | Pynchon |
| 3,468,472 A | 9/1969 | Hahn |
| 3,511,472 A | 5/1970 | Zimmerman |
| 3,628,565 A | 12/1971 | McWethy et al. |
| 3,785,395 A | 1/1974 | Andreasson |
| 3,831,628 A | 8/1974 | Kintner et al. |
| 3,968,925 A * | 7/1976 | Johnston ............... A61F 5/4405 137/855 |
| 3,973,588 A | 8/1976 | Holst |
| 3,983,907 A | 10/1976 | Sorensen |
| 3,995,653 A | 12/1976 | Mackal et al. |
| 4,015,622 A | 4/1977 | Pagani |
| 4,078,580 A | 3/1978 | Rudle |
| 4,176,681 A | 12/1979 | Mackal |
| 4,192,339 A | 3/1980 | Fisher |
| 4,478,587 A | 10/1984 | Mackal |
| 4,515,872 A | 5/1985 | Okano |
| 4,550,749 A | 11/1985 | Krikorian |
| 4,579,141 A | 4/1986 | Arff |
| 4,678,014 A | 7/1987 | Owen et al. |
| 4,712,574 A | 12/1987 | Perrott |
| 4,751,452 A | 6/1988 | Kilmer et al. |
| 4,766,628 A | 8/1988 | Walker |
| 5,111,838 A | 5/1992 | Langston |
| 5,184,309 A | 2/1993 | Simpson et al. |
| 5,267,363 A | 12/1993 | Chaffee |
| 5,343,889 A | 9/1994 | Jaw |
| 5,367,726 A | 11/1994 | Chaffee |
| 5,535,849 A | 7/1996 | Few |
| 5,904,172 A | 5/1999 | Gifft et al. |
| 5,941,272 A | 8/1999 | Feldman |
| 5,962,159 A | 10/1999 | Satou et al. |
| 6,237,621 B1 * | 5/2001 | Chaffee ................ A47C 27/081 137/223 |
| 6,418,579 B2 | 7/2002 | Perez et al. |
| 6,508,264 B2 | 1/2003 | Chaffee |
| 6,557,819 B2 | 5/2003 | Austin |
| 6,755,208 B2 | 6/2004 | Chaffee |
| 7,938,138 B2 | 5/2011 | Chaffee |
| 8,307,841 B2 | 11/2012 | Chaffee |
| 2001/0032948 A1 | 10/2001 | Austin |
| 2003/0205273 A1 | 11/2003 | Chaffee |
| 2008/0078032 A1 * | 4/2008 | Boyd ..................... A47C 27/10 5/710 |
| 2011/0083753 A1 * | 4/2011 | Chaffee ................ A47C 27/082 137/223 |
| 2012/0204333 A1 * | 8/2012 | Serin ..................... E03C 1/1225 4/211 |

FOREIGN PATENT DOCUMENTS

| | | |
|---|---|---|
| CN | 102448348 A | 5/2012 |
| DE | 2554719 A1 | 6/1977 |
| DE | 2701556 A1 | 7/1978 |
| DE | 102009024697 A1 | 12/2010 |
| EP | 0317021 A1 | 5/1989 |
| EP | 0852296 A2 | 7/1998 |
| GB | 841736 A | 7/1960 |
| WO | 2009070487 A1 | 6/2009 |

OTHER PUBLICATIONS

Notification of Transmittal of First Office Action and Search Report for Chinese Patent Application No. 2013/80049852.3 mailed Apr. 5, 2016.

* cited by examiner

US 9,752,693 B2

SELF-SEALING VALVE

CROSS-REFERENCE AND CLAIM OF PRIORITY

This application is a national phase application under 35 U.S.C. §371 of PCT International Application No. PCT/US2013/053442, filed Aug. 2, 2013, which claims the benefit of U.S. provisional patent application Ser. No. 61/679,288, filed Aug. 3, 2012, the entire contents of each of which are hereby incorporated by reference.

BACKGROUND OF INVENTION

1. Field of Invention

The Application is related to inflatable devices and more specifically to self-sealing valves used in inflatable devices including inflatable devices where a fluid controller is employed.

2. Discussion of Related Art

U.S. patent application Ser. No. 12/752,732 entitled Inflatable Device with Fluid Controller and Self-Sealing Valve, which is incorporated by reference herein in its entirety, describes embodiments of fluid controllers and self-sealing valves that are included in an inflatable device. In some of the embodiments described therein, the self-sealing valve is operated solely by air pressure on the inlet or outlet side of the valve while in other embodiments a valve operator (either manual or electrical) is employed in combination with at least one of the self-sealing valves.

The self-sealing valves described therein include a diaphragm which is attached to additional structure to provide rigidity and allow the diaphragm to hingedly open and close without deformation. For example, a flexible diaphragm is attached to a retaining member that includes one or more spokes that extend towards the periphery of the diaphragm to provide support and create an element of rigidity to the diaphragm.

In addition, the valves described therein include a number of separate components in addition to the diaphragm, for example, a frame that sits around the circumference of the opening which is sealed by the valve as well as a diaphragm support and a tab that is configured to engage a mechanical valve operator. As described in the application, the frame, the diaphragm support tab and the retaining member are all separate additional components that are assembled as part of the fluid controller.

As a result, these prior approaches add to the cost and complexity of manufacture because they require additional manufacturing steps for example to attach the frame to the housing of the fluid controller, to attach the retaining member to the diaphragm, and to attach the retaining member to the diaphragm support. Thus, individual components produced in separate manufacturing processes must be manufactured within relatively precise tolerances so that they will interact with one another in the desired fashion. These prior approaches require that individual components be attached to one another and to the fluid controller to provide a completed assembly.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
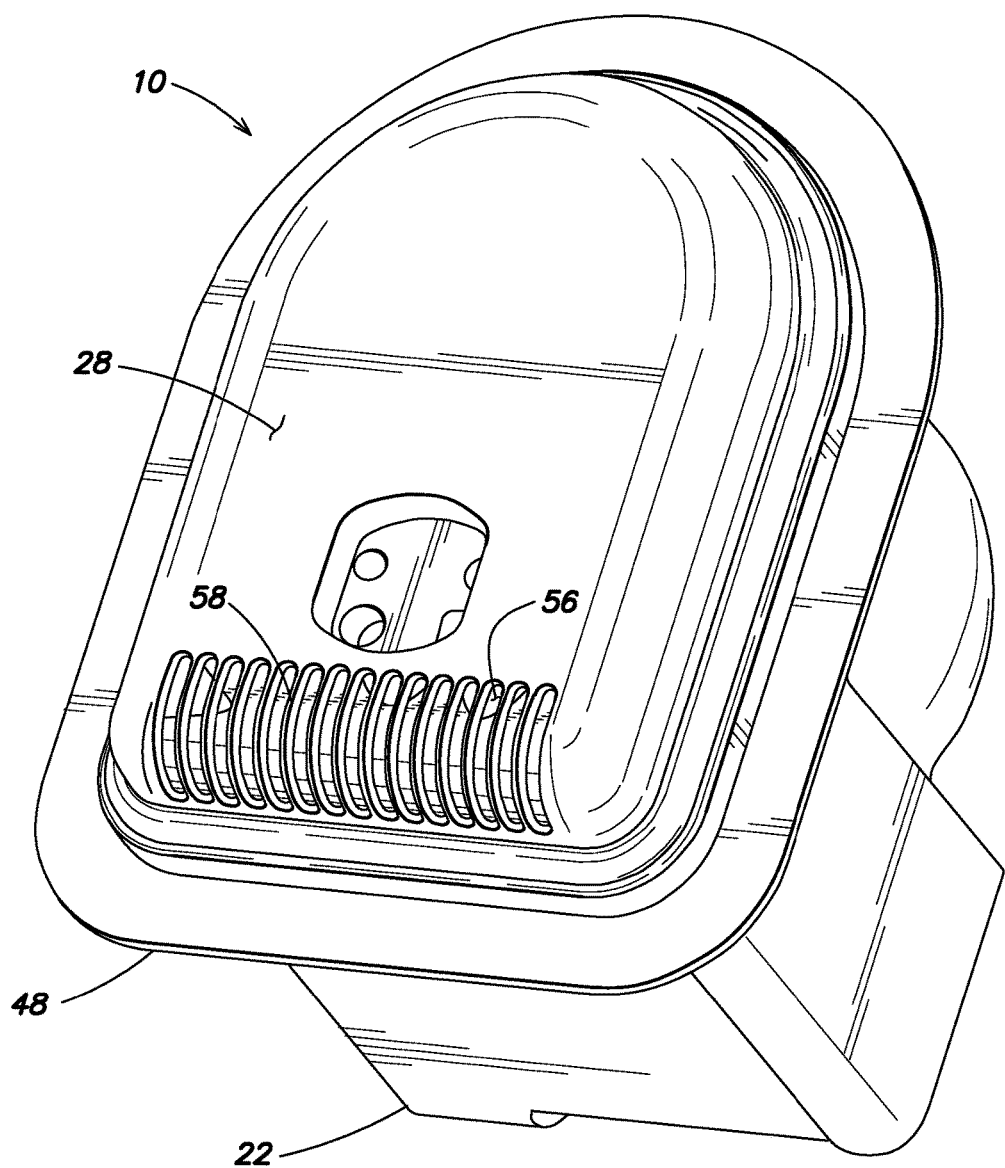
FIG. 1 is a perspective view of a fluid controller according to one embodiment.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

In one embodiment, an inflatable device includes a substantially fluid impermeable bladder and a fluid controller (for example, a fluid controller recessed within a profile of the bladder). As used herein, a fluid controller is a device capable of regulating fluid flow to and from an inflatable device and may include various components, such as a housing, a self-sealing valve, a fluid conduit, a motor and impeller, a valve actuator, a power connector, inlet and outlet ports, and the like.

As used herein, the term "recess" is defined as an indentation. For example, a recess in a bladder may comprise an indentation in a wall of the bladder, in which an object (e.g., a fluid controller) may be located. In addition, a recess may include a socket in a wall of the bladder in which a fluid controller is disposed.

As used herein, an object "positioned within" a bladder occupies a portion of the volume that would normally be occupied by the bladder, but is not completely enclosed within the bladder. It is also to be appreciated that although, in some embodiments, the fluid controller is described as being located within a wall of the bladder, it need not be directly connected to a wall of the bladder. For example, a fluid controller can be located within a recess in the wall of a bladder and be "positioned within" the bladder, as this term is defined and used herein.

The term "profile of a bladder" is defined herein as an outermost outline of the bladder, exclusive of any irregularities.

The term "chamber" as used herein is defined as all or a part of an interior of a fluid impermeable bladder where all portions of the chamber are fluidly coupled to one another such that independent adjustment of fluid pressure in separate portions (or sections) of the chamber is unavailable. In one embodiment, independent adjustment of the fluid pressure within regions of a chamber is unavailable and an adjustment of fluid pressure (i.e., by inflation or deflation) in any region of the chamber equally effects the fluid pressure in all regions of the chamber. Accordingly, in one embodiment, a chamber can include only one interior region of the bladder. According to other embodiments, a bladder provides a single chamber having multiple regions separated by baffles or other structure that remain fluidly coupled such that independent pressure adjustment of the various regions is not available. In an alternate embodiment, a single fluid impermeable bladder can be configured to provide multiple separate chambers such that independent pressure adjustment of a first chamber is available relative to adjustment of a second chamber included in the fluid impermeable bladder.

It is also to be appreciated that although a mattress is a type of inflatable device for which the fluid controller and self-sealing valve of the present invention may be used, the fluid controller and self-sealing valve may be used with any other type of inflatable device such as, for example; inflatable furniture or sporting items such as chairs, mattresses and pillows; inflatable safety devices such as life preservers, barriers, bumpers, and pads; inflatable medical devices such as supports, casts and braces; inflatable luggage devices such as padding and luggage lining materials; inflatable recreational devices such as swimming aids, floats, tubes and rings; inflatable vehicles and vehicle components such as boats, rafts and tires; inflatable support structures such as buildings, portable enclosures, platforms, ramps and the like.

As used herein with reference to changes in pressure within an inflatable bladder, the terms "rapid" and "sudden" refer to a rate of change in pressure that is substantial enough to momentarily deform a diaphragm of a self sealing valve fluidly coupled to the bladder.

Figure 2:
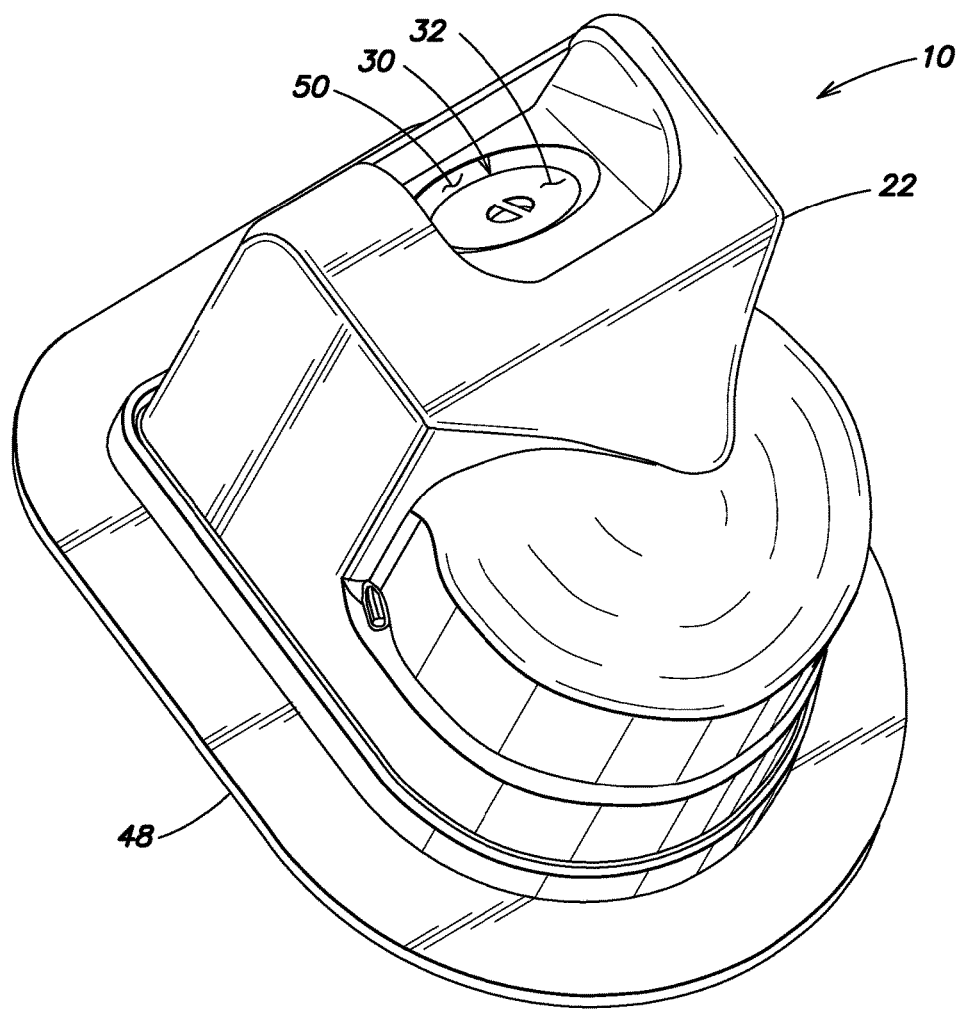
FIG. 2 is a bottom perspective view of a fluid controller according to one embodiment.

Referring first to FIGS. 1 and 2, one embodiment of a fluid controller 10 including a self-sealing valve 30 will be described by way of example. It is to be appreciated that the fluid controller 10 can be used with any inflatable device having a substantially fluid impermeable bladder that can be configured with a recessed fluid controller 10 at least partly positioned within the bladder. The bladder (not shown) may be constructed in any manner and of any material or materials capable of retaining a desired fluid under a degree of pressure necessary for its intended application. For example, the bladder may be constructed of a substantially fluid impermeable barrier and may be shaped in accordance with its intended use. For example, where the bladder is intended for use as a mattress, it can be constructed in the shape and thickness of a conventional mattress. In addition, the bladder may include internal structure, such as ribs or partitions. Further, the bladder may be divided into two or more separate fluid containing compartments. The bladder may also include internal structure to control the movement of fluid within the bladder. For example, the bladder may include baffles or walls (not shown) within the bladder to improve the flow of fluid when the bladder is inflated or deflated.

In some embodiments, the bladder may have an exhaust port (not shown) that is separate from the fluid controller. The exhaust port can be opened by the user to facilitate deflation of the bladder, and can be closed in a fluid-tight manner during inflation and use.

A wall of the bladder may be any thickness required to substantially contain a fluid under pressures at which the bladder will be used. The thickness of the wall of the bladder may depend upon the characteristics of the material from which the bladder is constructed. The bladder may be constructed of any material or materials capable of substantially containing a fluid and forming a bladder strong enough to withstand the fluid pressure at which the bladder is to be used, as well as any external pressures that might be encountered in normal use, such as the weight of one or more persons should the bladder be used as a mattress. In some embodiments, the bladder may be constructed from a relatively inexpensive, easy to work with, and durable material. For example, the bladder may be constructed of a polymeric material, such as a thermoplastic. Some example materials include polyvinyl chloride (PVC) film and polyester. In some embodiments, the material is chosen based on non-allergenic or other health or environmental considerations. The manner of making the bladder may depend on its material of construction and configuration, as will be recognized by one of ordinary skill in the art.

The bladder may also include additional materials to improve the utility and comfort of the bladder. For example, the bladder may include outer layers or coatings (not shown) for durability, support or comfort. In some embodiments, the bladder may be coated with a material that is more pleasant to the touch than the material from which the bladder is constructed. Where it is used to support a person, the bladder may also include a layer to provide additional comfort, particularly where the person is to contact the bladder. For example, the bladder may include a comfort layer (not shown) made of material for improving the texture and feel of the bladder, such as velvet or other tufted or non-tufted fabric.

In various embodiments, the fluid controller 10 may be constructed in any manner and using any materials that allow the fluid controller 10 to control the flow of fluid into and/or out of a fluid impermeable bladder 11. Referring now to the embodiment illustrated in FIG. 3, the fluid impermeable bladder 11 defines at least one chamber 15 capable of retaining fluid within it, for example, pressurized fluid. Referring again to FIGS. 1 and 2, the fluid controller 10 includes at least a motor, an impeller, a self-sealing valve 30, and a valve actuator that allow the fluid controller to inflate and/or deflate the bladder. For example, the motor of the fluid controller 10 rotatably drives the impeller, which moves a fluid, such as air, into or out of the bladder. The self-sealing valve 30 can be opened to allow fluid to pass into the bladder during the inflation process, and can be closed to prevent the escape of the fluid during use.

In some embodiments, the motor may be powered by one of an alternating current or a direct current. For example, the motor 12 may be configured to couple with a domestic electricity source, such as standard house current, through an electrical outlet. In accordance with some embodiments, the fluid controller 10 includes an electrically operated valve actuator. In some embodiments where portability is desired, the fluid controller 10 may be powered by batteries, such as commercially-available dry cell batteries, or a vehicle battery via a cigarette lighter. In one embodiment, the fluid controller 10 is constructed to contain one or more batteries to provide electrical power to the motor (and when applicable, fluid controller).

In some embodiments, the fluid controller 10 includes an outer housing 22. The outer housing 22 at least partially surrounds the components of the fluid controller 10, including the motor, the impeller, the self-sealing valve, the valve actuator, and any other electronics or other components of the fluid controller 10, thereby enclosing and protecting those components. The outer housing 22 may be constructed in any manner and of any material or materials durable enough to protect the fluid controller 10 in its intended application, and suitable to function as a fluid-impermeable outer wall. For example, the outer housing 22 may be constructed of a lightweight, inexpensive, durable, and fluid-impermeable material. The outer housing 22 may also be shaped such that it is not cumbersome. Materials for construction of the outer housing 22 may include a wide variety of relatively rigid thermoplastics, such as polyvinyl chloride (PVC) or acrylonitrile-butadiene-sytrene (ABS). However, it will be appreciated that the outer housing 22 may also be constructed of other materials, such as metals, metal alloys, and the like.

In some embodiments, for example, as seen in FIG. 1, the outer housing 22 may incorporate a structure for reducing the noise associated with the fluid controller 10, such as a muffler 28. The muffler 28 may be formed of the same or a similar type of thermoplastic as the outer housing 22, and in some embodiments the muffler 28 may further incorporate sound and/or vibration deadening materials on the inside of the fluid controller 10.

The fluid controller 10 can be connected to the bladder 11 in any manner that allows the fluid controller 10 to supply the bladder with fluid, and inhibit undesired escape of fluid from the bladder. For example, the bladder 11 may be constructed with at least a portion of the fluid controller 10 positioned within the bladder 11 so that the fluid controller 10 will obstruct the use of the bladder or the inflatable device incorporating it.

Figure 3:
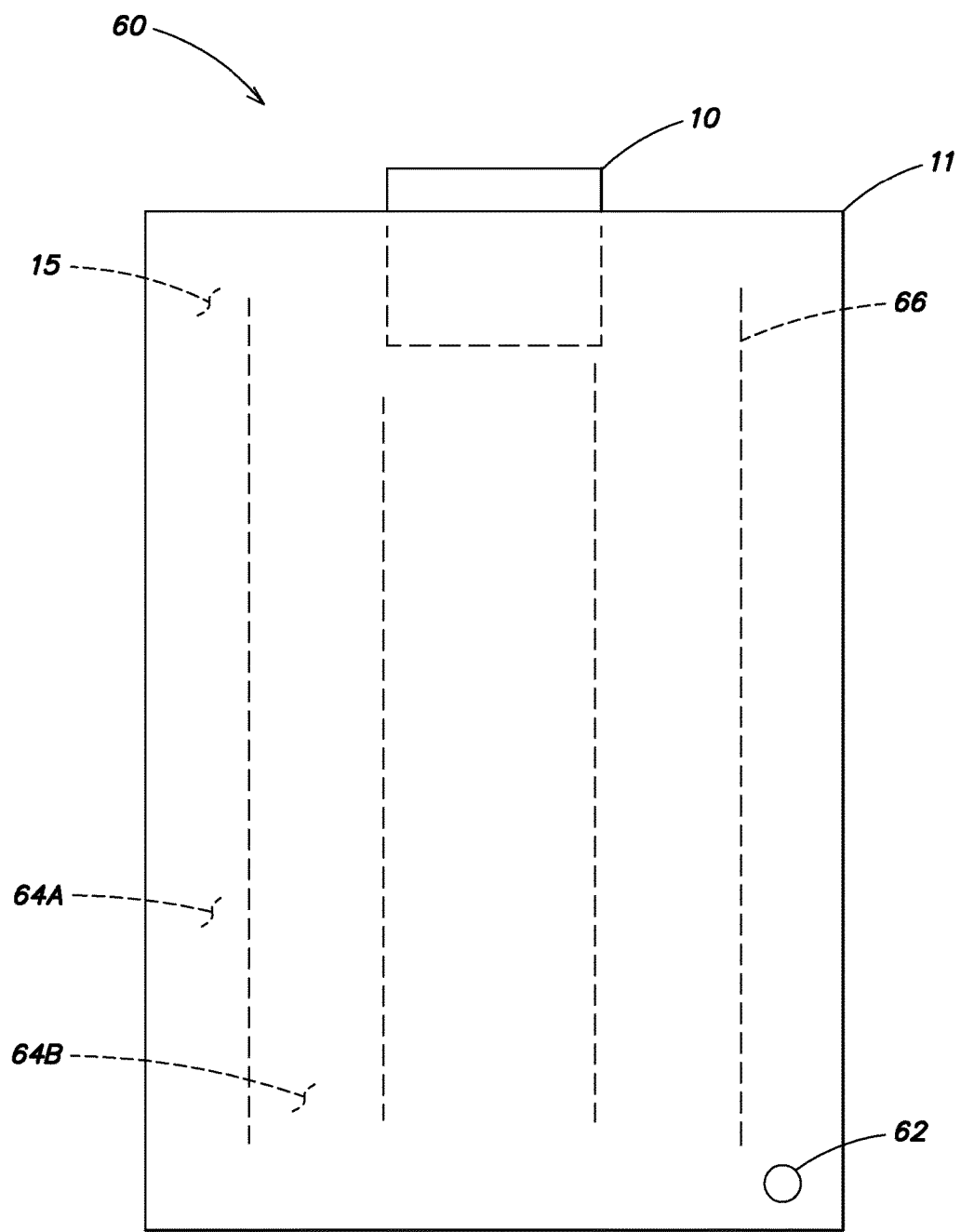
FIG. 3 is a view of an inflatable device in accordance with one embodiment.

Referring now to FIG. 3, an inflatable device 60 is illustrated in accordance with one embodiment. According to the illustrated embodiment, the inflatable device 60 includes the fluid controller 10, and a fluid impermeable bladder 11 that defines a first chamber 15. In accordance with one embodiment, the inflatable device 60 is an inflatable mattress, however, the inflatable device can take the form of any of a variety of inflatable devices configured to employ with a fluid controller 10. In accordance with the illustrated embodiment, the inflatable device 60 also includes an outlet valve 62. It should be apparent that where the fluid controller 10 is configured for both inflation and deflation of the inflatable device 60, the outlet valve 62 may not be included. According to one embodiment, the fluid controller 10 is configured for both inflation and deflation of the first chamber. According to this embodiment, the fluid controller 10 allows a user to release fluid from the chamber 15 for comfort control while the outlet valve 62 is employed as a "dump" valve to provide rapid deflation of the inflatable device 60.

In accordance with the illustrated embodiment, the first chamber 15 is constructed such that all the regions within the fluid impermeable bladder 11 and included in the first chamber 15, fluidly coupled to one another. For example, all the regions of the first chamber share the same fluid inlet(s) and fluid outlet(s). In accordance with these embodiments, pressure adjustment of the fluid pressure in the first chamber 15 equally affects all regions of the first chamber 15. Thus, the first chamber 15 may include one or more regions 64 which are partially separated from one another by seams, baffles or other structures 66 included in the inflatable device 60. However, such embodiments continue to operate at an equal pressure throughout the first chamber 15 because the configuration does not eliminate the fluid coupling and common control for the entirety of the first chamber 15.

In one embodiment, the exterior profile, that is, the total volume and shape, of the fluid controller 10 and the bladder in combination are essentially the same as the exterior profile of the bladder absent the combination. For example, the fluid controller 10 is located substantially within a bladder, shaped and sized as a standard-sized mattress so that the fluid controller 10 is within the profile of the bladder, that fits into a standard sized bed frame. The fluid controller 10 may be sized and connected to the bladder such that it will not come into contact with the bladder when the bladder is inflated, except at the point of connection between the fluid controller 10 and the bladder.

Where at least a portion of the fluid controller 10 is positioned within the bladder, it may be connected to the bladder in any manner that will not interfere with the use of the bladder or allow undesired escape of fluid from the bladder. For example, the bladder may be adhered or sealed to a portion of the fluid controller 10, using an adhesive or heat seal.

The fluid controller 10 may include some structure to facilitate its connection to the bladder. Referring again to FIG. 1, the fluid controller 10 may include a portion adapted to connect to the bladder, such as a flange 48. The flange 48 may, for example, extend from the outer housing 22 or may be a separate component connected to the outer housing 22. The flange 48 may be connected to the outer housing 22 of the fluid controller 10 anywhere and in any manner that allows it to connect the fluid controller 10 and the bladder 11 in a fluid-tight fashion. In some embodiments, the flange 48 may be formed on the outer housing 22, with the two components forming a unitary structure. In other embodiments, the flange 48 may be a separate component.

The flange 48 may be constructed of any material that allows it to durably connect the fluid controller 10 to the bladder in a fluid-tight fashion. For example, the flange 48 may be constructed of a material that is more flexible than the outer housing 22 of the fluid controller, but less flexible than the bladder, bridging the flexibility gap between the two structures and resulting in a durable seal that may be provided, for example, by heat sealing. One example of a suitable material of construction of the flange 48 is PVC. The thickness of the flange 48 may also affect its flexibility, with thinner flanges generally being more flexible than thicker flanges. Thus, the thickness of the flange 48 may be selected to provide a desired flexibility with a given material.

The flange 48 may be connected to the outer housing 22 or another portion of the fluid controller 10 in a manner allowing the components to easily be decoupled and recoupled. In some embodiments, the flange 48 may be configured to couple with a portion of the fluid controller 10 through use of a snap, screw, or other manner known in the art. Additional structure may also be included to promote a fluid seal between the flange 48 and the fluid controller 10. For example, a seal, such as an o-ring (not shown), may be placed between the flange 48 and the remainder of the fluid controller 10. In any of these embodiments, the ability to easily decouple the components allows the removal of portions of the fluid controller 10 for repair or replacement, thus preventing the entire inflatable device from having to be disposed of in the event of a failure of one component.

It will be appreciated that the fluid controller 10 may be positioned within the bladder in a variety of ways. For example, the fluid controller 10 and the flange 48 may be configured to position the fluid controller 10 at least partially to almost completely within a wall of the bladder. The size, shape and placement of the flange 48 with respect to the outer housing 22 of the fluid controller 10 may be selected to control how much of the fluid controller 10 is positioned within the bladder. Alternatively, the bladder may include a recess (not shown) and the fluid controller 10 may be positioned within the recess and attached to the recess at an outlet 50 of the fluid controller 10 such that the bladder and the fluid controller 10 are in fluid communication via the outlet 50. The outer housing 22 of the fluid controller 10 may additionally be attached to the recess at other locations within the recess.

Referring again to FIG. 1, the outlet 50 is provided to introduce fluid into the bladder from the fluid controller 10. An inlet 56 may be constructed in any manner to facilitate air flow into the fluid controller 10 from the external environment (i.e., from ambient). In this manner, fluid passes from the external environment through the inlet 56, into the fluid controller 10 and the interior 25 of the housing, through the outlet 50, and into the bladder. In some embodiments, the inlet 56 may include features to prevent foreign objects from being inserted into the fluid controller 10 and contacting the impeller 14. For example, in the illustrated embodiment seen in FIG. 1, the inlet 56 is covered by a grating 58 constructed to have multiple small openings for allowing fluid flow while preventing foreign objects, such as gravel, bedding, or a person's finger, from entering the fluid controller 10 and causing damage to the fluid controller 10 and/or the person operating it.

Figure 4:
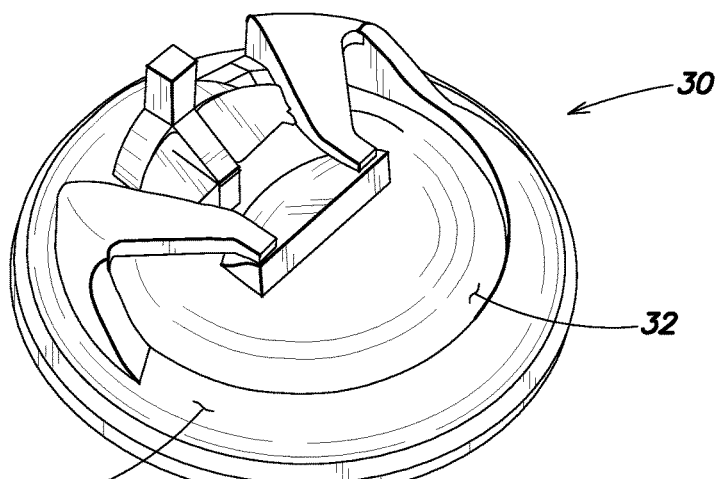
FIG. 4 is an embodiment of a self-sealing valve in accordance with one embodiment.

Referring now to FIG. 4, a valve is illustrated in accordance with one embodiment. The valve 30 includes a diaphragm 32 and a frame 40. In accordance with one embodiment the frame is formed as an integral part of a wall of the fluid controller 10. For example, in one embodiment the frame 40 is formed as a part of the outer wall 22 of the fluid controller 10.

Figure 5:
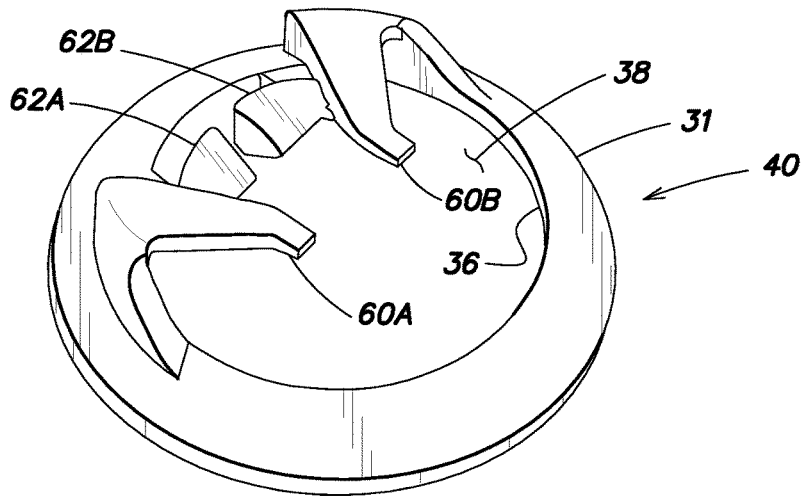
FIG. 5 is an embodiment of a portion of the self-sealing valve of FIG. 4 in accordance with a further embodiment.

Referring to FIG. 5, the frame 40 includes a rim 31, a valve seat 36 located on the underside of the rim 31, where the rim 31 defines an opening 38 which is configured to provide a fluid passage for a flow of fluid for at least one of inflation and deflation of fluid to and from the inflatable bladder, respectively.

In accordance with the illustrated embodiment, the frame 40 includes a base 62 and an extension 60. Further, the extension 60 can include a plurality of extensions, for example, a first extension 60a and a second extension 60b as shown in the illustrated embodiment. As also illustrated, the base 62 can include a first region 62a and a second region 62b that are separated by a gap.

In accordance with the illustrated embodiment the extension or plurality of extension 60a, 60b, extend radially inward from the frame such that they extend over the opening 38. Similarly, all or a portion of the base 62 can also extend into the opening 38.

As referred to above, in some embodiments, the frame 40 of the valve can be formed as an integral part of a wall of the fluid controller. Thus, where the housing of the fluid controller is manufactured from thermoplastic (such as PVC or ABS), the features of the frame 40 (including any of the rim 31, the valve seat 36, the extension 60 and the base 62) can be included along with other features of the fluid controller (for example, the outer housing 22) in the mold that is employed to form the fluid controller. The preceding approach can be employed in an injection molding process. In some embodiments, all of the non-moveable features of the valve 30 are formed as an integral part of the fluid controller housing. For example, in one embodiment, the features of each of the rim 31, the valve seat 36, the extension 60 and the base 62 are included the mold employed to form the fluid controller. According to this embodiment, the diaphragm 32 is the only element of the valve 30 that is not formed as an integral part of the fluid controller.

Figure 6:
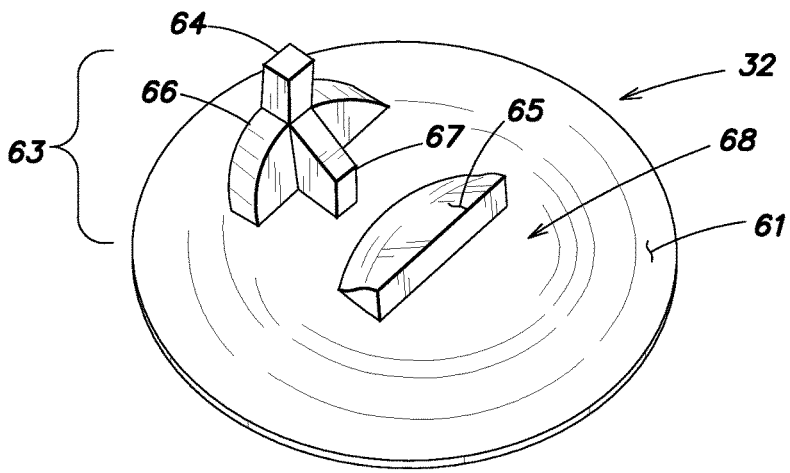
FIG. 6 is an embodiment of a diaphragm of FIG. 4 in accordance with yet another embodiment.

Referring now to FIG. 6, a diaphragm 32 of a self-sealing valve is illustrated in accordance with one embodiment. In the illustrated embodiment, the diaphragm 32 includes a surface 61, and a tab 63 and a region 68 that extend upward from the surface. In some embodiments, the region 68 includes a top surface 65. In accordance with the illustrated embodiment, the tab 63 includes a vertical section 64, a lateral section 66, and a radial section 67. According to some embodiments, the valve is assembled by inserting the tab 63 within the base 62 via a friction fit. In some embodiments each portion of the tab, the vertical section 64, the lateral section 66 and the radial section 67 are employed to attach the diaphragm to the frame 40. Further, one or more of the vertical section 64 and the lateral section 66 can be employed to maintain the shape and structure of the diaphragm 32 during operation. For example, the radial extension 67 can extend radially inward from the tab toward the center of the diaphragm 32 to increase the stiffness of the diaphragm in the region of the tab 63. In addition, the lateral section 66 can assist not only in providing a means of attachment to the frame 40 but also to increase the strength of the diaphragm 32 in the region of the tab 63.

In accordance with some embodiments the diaphragm 32 operates in a hinged fashion about the point of attachment at the base 62. For example, the diaphragm 32 can be manufactured from a flexible material that allows it to flex inward to open as a result of the fluid pressure and/or mechanical force applied to the inlet side. The diaphragm 32 can return to the illustrated position when the pressure/force is removed.

Referring to FIG. 4 the diaphragm 32 is viewed from an inlet side of the self-sealing valve 30. According to this embodiment, the side of the diaphragm viewed in FIG. 4 faces an interior of a fluid controller (which is an exterior of the fluid chamber of the inflatable device). As a result, the underside of the diaphragm 32 as illustrated in FIGS. 4 and 6 faces an interior of the inflatable bladder included in the inflatable device. According to one embodiment, fluid pressure on the side shown in FIG. 4 forces the diaphragm to operate in a hinged fashion to open inward while fluid pressure on the underside of the diaphragm 32 seals the diaphragm 32 against the valve seat 36 of the rim 31 in the absence of fluid pressure being provided by the fluid controller 10.

According to one embodiment the diaphragm 32 includes a region 68 that is configured to limit a deflection of the diaphragm 32 under pressure from within the inflatable chamber of the bladder. In some embodiments, a self sealing diaphragm-style valve has a great deal of flexibility that allows the diaphragm to conform to the valve seat and seal the valve under a bias of fluid pressure from within the inflatable bladder. In general, sudden increases in pressure within the interior of the inflatable device will act to deform the diaphragm 32 and cause it to deflect in a direction of the extension. The region 68 is configured to limit the deflection that might otherwise occur due to theses sudden increases in pressure.

Under normal operating conditions the position, of the diaphragm 32 provides a gap between the extension 60 and the region 68. However, a sudden increase in pressure that might be caused by the movement of a user on a comfort support device can cause the deflection of the diaphragm 32. Sufficient deflection of the diaphragm 32 can cause the region 68 to make contact with the extension 60. The interference created by the extension 60 stops any further deflection of the diaphragm 32. This is advantageous because a seal formed between the diaphragm 32 and the valve seat 36 can be maintained during the pressure spike by limiting the amount of deflection of the diaphragm 32.

According to various embodiments, the region 68 includes a protrusion or other structure that is raised from the surface 61 of the diaphragm 32. Further, the height of the region 68 is determined as a distance between the surface of the diaphragm 32 and the top surface 65 of the region 68. In various embodiments, the height of the region 68 is determined as a height that is short enough to avoid constant contact between the region 68 and the extension 60 when a nominal pressure is maintained in the bladder but tall enough to contact the extension during a pressure excursion before the seal of the valve 30 is broken.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A self sealing valve, comprising:
   a frame including a rim that defines a fluid passage for a flow of fluid for at least one of inflation and deflation of an inflatable bladder;
   a diaphragm configured to seal the fluid passage, the diaphragm including a first side exposed to an interior of the inflatable bladder and a second side opposite the first side; and
   at least one extension integrally formed with the rim and configured to extend radially inward from the frame over the second side of the diaphragm, the at least one extension configured to limit a deflection of the diaphragm in a direction away from the interior to maintain a substantially fluid-tight seal between the diaphragm and the rim when the diaphragm is exposed to an increase in pressure within the interior;
   the frame including an integrally formed base configured to receive the diaphragm;
   the diaphragm and the base being configured for a hinged operation of the diaphragm about a direct point of attachment of the diaphragm at the base so as to hingedly open and close the diaphragm while received by the base; and
   the diaphragm being movable independently of the at least one extension;
   wherein the valve is configured such that the diaphragm is an only moving component of the valve when the valve is opened and closed.

2. The self sealing valve of claim 1, the at least one extension comprising a plurality of extensions configured to extend over the second side of the diaphragm and configured to limit the deflection of the diaphragm.

3. The self sealing valve of claim 1, wherein the self sealing valve is included in a housing of a fluid controller.

4. The self sealing valve of claim 3, wherein a region of the housing of the fluid controller includes at least one wall of the housing of the fluid controller, and
   wherein the at least one extension and the frame are formed as an integral molded feature of the region.

5. The self-sealing valve of claim 4, wherein the region of the housing includes a plurality of walls that define a profile of the fluid controller.

6. The self sealing valve of claim 4, wherein the region is formed of ABS plastic.

7. The self-sealing valve of claim 1, wherein the second side of the diaphragm includes at least one region configured to make contact with the at least one extension when the diaphragm is deflected in the direction away from the interior.

8. The self sealing valve of claim 7, wherein the at least one region includes a protrusion configured to make contact with the at least one extension.

9. The self-sealing valve of claim 1, wherein the at least one extension includes a plurality of arms.

10. The self sealing valve of claim 9, wherein the second side of the diaphragm includes at least one region configured to make contact with the plurality of arms when the diaphragm is deflected in the direction away from the interior.

11. The self-sealing valve of claim 10, wherein the valve is configured to maintain the substantially fluid-tight seal under a nominal pressure within the interior while providing a gap between the at least one region and the plurality of arms when the diaphragm is not exposed to the increase in pressure within the interior.

12. A fluid controller comprising the self-sealing valve of claim 1.

13. The fluid controller of claim 12, further comprising a pump.

14. The fluid controller of claim 13, wherein the fluid controller and the inflatable bladder are included in an air mattress.

15. The self sealing valve of claim 1, wherein the diaphragm consists essentially of a flexible material.

16. A self sealing valve, comprising:
    a frame including a rim that defines a fluid passage for a flow of fluid for at least one of inflation and deflation of an inflatable bladder;
    a diaphragm configured to seal the fluid passage, the diaphragm including a first side exposed to an interior of the inflatable bladder and a second side opposite the first side; and
    at least one extension integrally formed with the rim and configured to extend radially inward from the frame over the second side of the diaphragm, the at least one extension configured to limit a deflection of the diaphragm in a direction away from the interior to maintain a substantially fluid-tight seal between the diaphragm and the rim when the diaphragm is exposed to an increase in pressure within the interior;
    the frame including an integrally formed base configured to receive the diaphragm;
    the diaphragm and the base being configured for a hinged operation of the diaphragm about a direct point of attachment of the diaphragm at the base so as to hingedly open and close the diaphragm while received by the base; and
    the diaphragm being movable independently of the at least one extension;
    wherein the second side of the diaphragm includes a tab that extends substantially perpendicular from the second side, the tab configured to attach the diaphragm to the base of the frame by a friction fit; and
    wherein the tab includes a radial extension extending radially inward toward a center of the diaphragm, and the tab includes a lateral section perpendicular to the radial extension.

17. A method of maintaining a seal provided by a self-sealing valve through sudden increases in a pressure within an inflatable bladder to which the valve is fluidly coupled, the inflatable bladder included in a comfort support device configured to support a user, the method comprising acts of:
    providing a valve consisting essentially of a frame and a diaphragm, the frame having a rim and at least one extension, and the diaphragm coupled to the frame, the diaphragm configured to form a seal with the rim under the pressure within the inflatable bladder and to open under fluid pressure provided by an inflation device fluidly coupled to the valve, the at least one extension being integrally formed with the rim and extending radially inward from the frame, the frame including an integrally formed base configured to receive the diaphragm, the diaphragm and the base being configured for a hinged operation of the diaphragm about a direct point of attachment of the diaphragm at the base so as to hingedly open and close the diaphragm while received by the base, and the diaphragm being movable independently of the at least one extension; and configuring the valve such that a deflection of the diaphragm is stopped by an interference with the at least one extension to prevent the seal from being broken when the diaphragm deflects in response to the sudden increase in pressure within the bladder when supporting the user.

18. The method of claim 17, further comprising an act of configuring the at least one extension such that at least a portion of the extension is suspended above a surface of the diaphragm with the pressure at a nominal level.

19. The method of claim 17, wherein the sudden increase in pressure is created when the user first applies at least a portion of their body weight to a surface of the comfort support device.

20. The method of claim 17, wherein the sudden increase in pressure is created when the user being supported by the comfort support device makes a sudden shift in position.

21. The method of claim 17, wherein the valve is configured such that the diaphragm is an only moving component of the valve when the valve is opened and closed.

22. A method of integrating a valve in a fluid controller, the fluid controller configured for use in an inflatable mattress, the method comprising:

forming at least one wall of an exterior of a housing of the fluid controller from a single molded piece of plastic;

forming a frame for a valve in the at least one wall of the single molded piece of plastic;

including a base integrally formed with the frame, the base configured to receive a diaphragm attached to the frame at the base by a friction fit, the diaphragm and the base being configured for a hinged operation of the diaphragm about a direct point of attachment at the base to open and close the diaphragm while received by the base, the diaphragm being an only moving component of the valve when the valve is opened and closed; and forming at least one extension integrally with the frame, the at least one extension extending radially inward from the frame, the diaphragm being movable independently of the at least one extension.

23. The method of claim 22, further comprising forming, in the single piece of molded plastic, the exterior of the housing including a plurality of walls including the at least one wall.

24. The method of claim 22, further comprising attaching the diaphragm to the frame solely by the friction fit.

25. A method of maintaining a seal provided by a self-sealing valve through increases in pressure within an inflatable bladder to which the valve is fluidly coupled, the inflatable bladder included in a comfort support device, the increases in pressure occurring in response to a force provided to a surface of the comfort support device by a user, the method comprising acts of:

providing a valve consisting essentially of a frame and a diaphragm, the frame having a rim and at least one extension, and the diaphragm coupled to the frame, the diaphragm configured to form a seal with the rim under the pressure within the inflatable bladder, the at least one extension being integrally formed with the rim and extending radially inward from the frame; and providing a base integrally formed with the frame, the base configured to receive the diaphragm attached to the frame at the base by a friction fit, the diaphragm and the base being configured for a hinged operation of the diaphragm about a direct point of attachment of the diaphragm at the base to open and close the diaphragm while received by the base; and configuring the valve such that a deflection of the diaphragm is stopped by an interference with the at least one extension to prevent the seal from being broken when the diaphragm deflects in response to the increases in pressure;

wherein the diaphragm is an only moving component of the valve when the valve is opened and closed.

26. The method of claim 25, wherein the force results in a displacement of fluid within the inflatable bladder.

27. A self sealing valve, consisting essentially of:

a frame; and a diaphragm frictionally secured to the frame;

the frame including a rim that defines a fluid passage for a flow of fluid for at least one of inflation and deflation of an inflatable bladder;

the diaphragm being configured to seal the fluid passage, the diaphragm including a first side exposed to an interior of the inflatable bladder and a second side opposite the first side; and at least one extension integrally formed with the rim and configured to extend over the second side of the diaphragm, the at least one extension configured to limit a deflection of the diaphragm in a direction away from the interior to maintain a substantially fluid-tight seal between the diaphragm and the rim when the diaphragm is exposed to an increase in pressure within the interior;

the diaphragm being an only moving component of the valve when the valve is opened and closed.

* * * * *

UNITED STATES PATENT AND TRADEMARK OFFICE
CERTIFICATE OF CORRECTION

PATENT NO. : 9,752,693 B2
APPLICATION NO. : 14/419102
DATED : September 5, 2017
INVENTOR(S) : Robert B. Chaffee It is certified that error appears in the above-identified patent and that said Letters Patent is hereby corrected as shown below:

In the Specification

Column 1, Lines 9-10, delete "61/679,288" and insert -- 61/679,228 --.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*